United States Patent
Kube et al.

(10) Patent No.: US 12,157,844 B2
(45) Date of Patent: Dec. 3, 2024

(54) SOLVENT-BASED PRETREATMENT AGENT HAVING IMPROVED ADHESION TO RESIDUAL ADHESIVE BEADS

(71) Applicant: SIKA TECHNOLOGY AG, Baar (CH)

(72) Inventors: Nicole Kube, Unterengstringen (CH); Sven Reimann, Zürich (CH); Michael Schlumpf, Stallikon (CH)

(73) Assignee: SIKA TECHNOLOGY AG, Baar (CH)

( * ) Notice: Subject to any disclaimer, the term of this patent is extended or adjusted under 35 U.S.C. 154(b) by 289 days.

(21) Appl. No.: 17/765,666

(22) PCT Filed: Dec. 15, 2020

(86) PCT No.: PCT/EP2020/086214
§ 371 (c)(1),
(2) Date: Mar. 31, 2022

(87) PCT Pub. No.: WO2021/122593
PCT Pub. Date: Jun. 24, 2021

(65) Prior Publication Data
US 2022/0348793 A1    Nov. 3, 2022

(30) Foreign Application Priority Data
Dec. 17, 2019  (EP) .................................. 19216864

(51) Int. Cl.
| | | |
|---|---|---|
| *B32B 41/00* | (2006.01) | |
| *C09J 5/02* | (2006.01) | |
| *C09J 11/04* | (2006.01) | |
| *C09J 175/14* | (2006.01) | |
| *C09J 183/04* | (2006.01) | |

(52) U.S. Cl.
CPC ............... *C09J 5/02* (2013.01); *C09J 11/04* (2013.01); *C09J 175/14* (2013.01); *C09J 183/04* (2013.01); *C09J 2475/00* (2013.01); *C09J 2483/00* (2013.01)

(58) Field of Classification Search
CPC ... C09J 5/02; C09J 11/04; C09J 175/14; C09J 183/04; C09J 2475/00; C09J 2483/00; C09J 2475/003; C09J 175/04; C08G 18/10; C08G 18/227; C08G 18/2865; C08G 18/289; C08G 18/6229; C08G 18/7657; C08G 18/775; C08G 18/776; C09D 175/04
USPC ................... 156/60, 64, 350, 351, 378, 379
See application file for complete search history.

(56) References Cited

U.S. PATENT DOCUMENTS

| | | |
|---|---|---|
| 2016/0185918 A1 | 6/2016 | Hinzmann et al. |
| 2018/0251590 A1* | 9/2018 | Kunitomo ............ C08G 18/755 |
| 2021/0171700 A1* | 6/2021 | Corsaro ................... C08K 3/04 |

FOREIGN PATENT DOCUMENTS

| | | | | |
|---|---|---|---|---|
| EP | 2805985 A1 | 11/2014 | | |
| EP | 3406644 A1 * | 11/2018 | ............. | C08G 18/12 |
| JP | 2013-018879 A | 1/2013 | | |
| WO | 2013/174891 A2 | 11/2013 | | |
| WO | 2013/174892 A1 | 11/2013 | | |
| WO | 2018/215445 A1 | 11/2018 | | |

OTHER PUBLICATIONS

Mar. 1, 2021 International Search Report issued in International Patent Application No. PCT/EP2020/086214.
May 17, 2022 International Preliminary Report on Patentability issued in International Patent Application No. PCT/EP2020/086214.

* cited by examiner

*Primary Examiner* — Michael N Orlando
*Assistant Examiner* — Joshel Rivera
(74) *Attorney, Agent, or Firm* — Oliff PLC

(57) ABSTRACT

A pretreatment composition for adhesive bonds, including i) between 10 and 30 parts by weight of at least one polyurethane polymer PU containing isocyanate groups, obtained from the reaction of at least one poly(meth)acrylate polyol P and at least one polyisocyanate I1, with the proviso that the poly(meth)acrylate polyol P has an OH number of at least 35 and the polyurethane polymer PU has an NCO content of between 2.0% and 25.0% by weight, based on the polyurethane polymer PU; ii) 0.1 to 10 parts by weight of at least one organosilane OS; iii) 0 to 10 parts by weight of at least one further polyisocyanate I2; iv) 60 to 90 parts by weight of a solvent L; v) 0 to 15 parts by weight of an industrial carbon black; vi) 0 to 10 parts by weight of a fumed hydrophobic silica.

16 Claims, No Drawings

SOLVENT-BASED PRETREATMENT AGENT HAVING IMPROVED ADHESION TO RESIDUAL ADHESIVE BEADS

TECHNICAL FIELD

The invention relates to the field of solvent-based pretreatment compositions for adhesive bonds, and to methods of bonding or sealing by means of such pretreatment compositions.

STATE OF THE ART

Solvent-based pretreatment compositions, especially as primers or adhesion promoter undercoats, have long been used to improve the adhesion of adhesives, sealants, coatings and coverings on the substrate. Such adhesion promoter compositions enable robust adhesive bonding or coating of substrates without these requiring any further pretreatment in another way, for example mechanical pretreatment or other complex processes. The rapid evaporation of the solvents additionally enables rapid work and cycle times in the case of adhesive bonds in construction or in industry, or short driveaway times in the case of automotive glazing repairs.

In the installation of replacement glazing, especially windshields, in vehicles, it has to be ensured by means of adhesive that the new bond meets the demands with regard to crash resistance, mechanical properties and leaktightness even after a short time, typically 30 to 60 minutes, and also over the entire service life. For this purpose, as well as the mechanical properties required and the high reactivity of the adhesive, a robust bond between the adhesive and the substrates involved also has to be ensured. This is typically achieved by the use of pretreatment compositions (adhesion promoters, activators or primers).

Experience has shown that, in the installation of replacement glazing, the adhesion of the adhesive on the flange is a critical factor since the flange has both areas with exposed paint and those with residues of the old adhesive adhering to the paint ("residual bead"), and the new adhesive has to adhere well to both substrates. It has been found here that pretreatment compositions according to the prior art often do not bring about sufficient adhesion of the adhesive, especially to the residual bead. This effect is manifested particularly clearly in the case of accelerated-curing (boosted) adhesive systems and/or in the case of distinctly aged residual beads.

For replacement glazing in vehicles, primarily black, carbon black-containing pretreatment compositions are utilized. These generally have advantageous properties such as good adhesion promotion and, in particular, elevated UV stability. However, they have the disadvantage that these, according to the design of the flange and color of the paint used, remain visible in the vehicle after the replacement glazing has been installed in the case of inexact or excessively broad application, which is perceived as an esthetic fault by the customer. In addition, the risk of readily visible soiling on other parts of the vehicle with black pretreatment compositions is distinctly increased.

In practice, the abovementioned properties of known pretreatment compositions lead to the following restrictions and disadvantages in particular: Even though the replacement bond is fundamentally technically functional even in the case of less than one hundred percent adhesion on the flange, the partial lack of adhesion on the flange can lead to ingress of water and wind noise, which will be the subject of customer complaints.

In order to remedy this, different products have to be used to some degree for the pretreatment of the replacement glazing and the flange, which firstly increases the process risk on account of possible product confusion and secondly also increases costs.

Moreover, soiling in the vehicle by black pretreatments can lead to considerable subsequent costs.

SUMMARY OF THE INVENTION

It is therefore an object of the present invention to provide a solvent-based pretreatment composition for adhesive bonds which enables very good adhesion of the adhesive applied both on the flange and on the replacement glazing. More particularly, robust adhesion on paints, metals, glass, ceramics and residual beads of a previously removed aged adhesive is to be achieved. The adhesive of which the residual bead consists is typically a polyurethane adhesive or an adhesive based on silane-functional polymers. The corresponding pretreatment composition is to be employable within a broad temperature range. Furthermore, this pretreatment composition should be in a clear, transparent and largely colorless formulation.

It has been found that, surprisingly, these objects can be achieved by a pretreatment composition as claimed in claim 1.

The pretreatment composition of the invention, in preferred embodiments, forms a clear, transparent and at most light-colored film on the substrate, and hence does not remain visible on the flange after application. In all embodiments, it results in good to very good adhesion of an adhesive applied thereto to the flange, especially improving the adhesion to residual bead, both on fresh and on aged residual beads. Good adhesion to the flange is achieved even when an accelerated-curing (boosted) adhesive system is used. Even on the other substrates of relevance in replacement glazing, such as glass, ceramics and paints, the pretreatment composition results in very good adhesion and hence assures full functionality of the adhesive bond implemented.

The most important advantages of the pretreatment composition of the invention include improved adhesion of a newly applied adhesive on fresh and aged residual adhesive beads, improved adhesion on glass and ceramics, improved adhesion on paints, broad possible range of application temperature and air humidity, rapid crosslinking and plasticizer barrier, good film formation, and improved corrosion protection and the option of formulating the pretreatment composition in a clear, transparent and largely colorless manner.

Further aspects of the invention are the subject of further independent claims. Particularly preferred embodiments of the invention are the subject of the dependent claims.

WAYS OF EXECUTING THE INVENTION

The present invention provides a pretreatment composition for adhesive bonds, comprising
i) between 10 and 30 parts by weight of at least one polyurethane polymer PU containing isocyanate groups, obtained from the reaction of at least one poly(meth)acrylate polyol P and at least one polyisocyanate I1, with the proviso that the poly(meth)acrylate polyol P has an OH number of at least 35 and the polyurethane polymer PU has an NCO content of between 2.0% and 25.0% by weight, preferably between 3.0% and 20.0% by weight, especially between 5.0% and 15.0% by weight, based on the polyurethane polymer PU;

ii) 0.1 to 10 parts by weight of at least one organosilane OS;

iii) 0 to 10 parts by weight of at least one further polyisocyanate I2;

iv) 60 to 90 parts by weight of a solvent L;

v) 0 to 15 parts by weight of an industrial carbon black;

vi) 0 to 10 parts by weight of a fumed hydrophobic silica.

In the present document substance names beginning with "poly" such as polyol or polyisocyanate refer to substances formally containing two or more of the eponymous functional groups per molecule.

In the present document the term "polymer" firstly encompasses a collective of macromolecules that are chemically uniform but differ in the degree of polymerization, molar mass, and chain length, said collective having been produced by a "poly" reaction (polymerization, polyaddition, polycondensation).

The term secondly also encompasses derivatives of such a collective of macromolecules from "poly" reactions, i.e. compounds that have been obtained by reactions, for example additions or substitutions, of functional groups on defined macromolecules and that may be chemically uniform or chemically nonuniform. The term further encompasses so-called prepolymers too, i.e. reactive oligomeric initial adducts, the functional groups of which are involved in the formation of macromolecules.

The term "polyurethane polymer" encompasses all polymers that are prepared by what is called the polyisocyanate polyaddition process. This also includes polymers that are virtually or completely free of urethane groups. Examples of polyurethane polymers are polyether polyurethanes, polyester polyurethanes, polyether polyureas, polyureas, polyester polyureas, polyisocyanurates, and polycarbodiimides.

"Monomeric diisocyanate" refers to an organic compound having two isocyanate groups separated from one another by a divalent hydrocarbyl radical having 4 to 15 carbon atoms.

"NCO content" refers to the content of isocyanate groups in percent by weight based on the whole polymer.

In the present document the term "silane" refers to compounds which on the one hand have at least one, typically two, three or four, alkoxy groups or acyloxy groups bonded directly to the silicon atom via Si—O bonds. The term "organosilane" refers to silanes which additionally have at least one, and sometimes two or three, organic radicals bonded directly to the silicon atom via an Si—C bond. Such silanes are also known to the person skilled in the art as organoalkoxysilanes or organoacyloxysilanes. Consequently, "tetraalkoxysilanes" are not organosilanes according to this definition, but belong to the silanes.

Accordingly, the term "silane group" refers to the silicon-containing group bonded to the organic radical of the silane bonded via the Si—C bond. The silanes, i.e. the alkoxy- or acyloxysilane groups thereof, have the property of undergoing hydrolysis upon contact with moisture. This forms organosilanols, i.e. organosilicon compounds containing one or more silanol groups (Si—OH groups) and, through subsequent condensation reactions, organosiloxanes, i.e. organosilicon compounds containing one or more siloxane groups (Si—O—Si groups).

The term "silane-functional" refers to compounds having at least one silane group, especially one that is hydrolyzable.

"Silane-functional polymers" are accordingly polymers comprising at least one silane group, especially one that is hydrolyzable.

"Aminosilanes", "hydroxysilanes" and "mercaptosilanes" refer to organosilanes whose organic radical comprises an amino group, hydroxyl group and mercapto group respectively. "Primary aminosilanes" refer to aminosilanes having a primary amino group, i.e. an $NH_2$ group bonded to an organic radical. "Secondary aminosilanes" refer to aminosilanes having a secondary amino group, i.e. an NH group bonded to two organic radicals.

A substance or composition is referred to as "storage-stable" or "storable" when it can be stored at room temperature in a suitable container over a prolonged period, typically over at least 3 months, preferably up to 6 months or more, without any change in its application or service properties to an extent relevant for service thereof, as a result of the storage. Storage stability can be estimated by conducting storage at elevated temperatures, which simulates storage for a longer period at lower temperatures, such as room temperature.

"Solids content" of the pretreatment composition of the invention refers to the percentage proportion by mass that would remain after theoretical volatilization of the volatile components (primarily the solvent). The term "solids content" in connection with the present invention refers more particularly to the percentage proportion of the sum total of the masses of the polyurethane polymer PU, the organosilane OS, and any further nonvolatile constituents present, for example polyisocyanate I2, based on the total mass of the pretreatment composition.

"Room temperature" refers to a temperature of about 23° C.

All industry standards and norms mentioned in the document refer to the version valid at the date of first filing.

The terms "mass" and "weight" are used synonymously in this document. Thus a "percentage by weight" (% by weight) is a percentage proportion by mass which, unless stated otherwise, refers to the mass (weight) of the overall composition or, depending on the context, of the entire molecule.

"Molecular weight" in the present document is understood to mean the molar mass (in grams per mole) of a molecule or part of a molecule, also referred to as a "radical". "Average molecular weight" denotes the number-average $M_n$ of an oligomeric or polymeric mixture of molecules or radicals which is typically determined by means of gel permeation chromatography (GPC) against a polystyrene standard.

Polyurethane Polymer PU

A first essential constituent of the pretreatment composition of the invention is between 10 and 30 parts by weight of at least one polyurethane polymer PU containing isocyanate groups, obtained from the reaction of at least one poly(meth)acrylate polyol P and at least one polyisocyanate I1, with the proviso that the poly(meth)acrylate polyol P has an OH number of at least 35 and the polyurethane polymer PU has an NCO content of between 2.0% and 25.0% by weight, preferably between 3.0% and 20.0% by weight, especially between 5.0% and 15.0% by weight, based on the polyurethane polymer PU, and that the polyurethane polymer PU preferably has a residual content of unreacted polyisocyanate I1 of <0.5% by weight, based on the polyurethane polymer PU.

The stated 10 to 30 parts by weight is based on the pure isocyanate group-containing polymer PU formed in the reaction as described above. Any solvents or plasticizers as are often present in the polyols for lowering viscosity, unreacted reactants, by-products or cleavage products are not counted here as part of the 10 to 30 parts by weight.

Suitable isocyanate group-containing polyurethane polymers PU are polymers obtainable by the reaction of at least one polyol P with at least one polyisocyanate I1, especially a diisocyanate or a triisocyanate. This reaction can be effected by reacting the polyol P and the polyisocyanate I1 by customary processes, for example at temperatures of 50° C. to 100° C., preferably with additional use of a catalyst suitable for the purpose, with metered addition of the polyisocyanate I1 in such a way that the isocyanate groups thereof are present in stoichiometric excess in relation to the hydroxyl groups of the polyol P.

In particular, the excess of polyisocyanate I1 is chosen so as to leave, in the resulting polyurethane polymer, after the reaction of all hydroxyl groups of the polyol, a content of free isocyanate groups of 2.0% to 25.0% by weight, preferably between 3.0% and 20.0% by weight, especially between 5.0% and 15.0% by weight, based on the overall polymer.

The polyurethane polymer is preferably prepared with additional use of solvent L, where the solvent L must not contain any groups reactive toward isocyanates.

Preference is given firstly to polyurethane polymers PU having the abovementioned content of free isocyanate groups which are obtained from the reaction of polyisocyanate I1 with polyol P in an NCO:OH ratio (molar ratio of NCO groups of polyisocyanate I1 to OH groups of polyol P) of 1.3:1 to 10:1.

The reaction is preferably conducted with exclusion of moisture at a temperature in the range from 20 to 160° C., especially 40 to 140° C., optionally in the presence of suitable catalysts.

The NCO/OH ratio is preferably in the range from 1.3/1 to 10/1. The polyisocyanate I1, especially monomeric polyisocyanate I1, remaining in the reaction mixture after the reaction of the OH groups can be removed, especially by means of distillation.

If excess monomeric polyisocyanate I1 is removed by means of distillation, the NCO/OH ratio in the reaction is preferably in the range from 3/1 to 10/1, especially 4/1 to 7/1, and the resultant polyurethane polymer PU containing isocyanate groups, after the distillation, preferably contains less than 0.5% by weight, more preferably not more than 0.3% by weight, of monomeric polyisocyanate I1.

If no excess polyisocyanate I1 is removed from the polyurethane polymer PU, the NCO/OH ratio in the reaction is preferably in the range from 1.3/1 to 10/1, preferably from 1.5/1 to 8/1. In addition, in these cases, preference is given to using no monomeric polyisocyanate I1 but rather oligomeric polyisocyanate I1, or, most preferably, tris(p-isocyanatophenyl) thiophosphate.

The polyurethane polymer PU, after preparation thereof and any removal of residual unreacted polyisocyanate I1, preferably contains not more than 0.5% by weight, preferably not more than 0.3% by weight, especially not more than 0.2% by weight, more preferably less than 0.1% by weight, of unreacted polyisocyanate I1, based on the total weight of the polyurethane polymer PU. This is particularly preferred when monomeric diisocyanates such as MDI are used as polyisocyanate I1. Such a low content of polyisocyanate I1, especially monomeric diisocyanates, has advantages particularly with regard to occupational safety and toxicology.

Particular preference is given to obtaining the polyurethane polymer PU:
either from the reaction of tris(p-isocyanatophenyl) thiophosphate with a poly(meth)acrylate polyol, where the poly(meth)acrylate polyol has an average OH functionality of 3.5 to 4.5;
or from the reaction of methylene diphenyl diisocyanate (MDI) with a poly(meth)acrylate polyol, where the poly(meth)acrylate polyol has an average OH functionality of 3.5 to 4.5, and where the molar ratio of isocyanate groups of polyisocyanate I1 to OH groups of the poly(meth)acrylate polyol P is between 3/1 and 10/1, and where the excess polyisocyanate I1 is removed by means of distillation after the reaction.

Poly(meth)acrylate Polyol P

Suitable polyols P for the preparation of the polyurethane polymer PU are exclusively poly(meth)acrylate polyols, although it is additionally possible to use small amounts of other polyols. The polyols P used for preparation of the polyurethane polymer PU should consist of poly(meth)acrylate polyols to an extent of at least 90% by weight, preferably at least 95% by weight, most preferably to an extent of 100% by weight. Poly(meth)acrylate polyols P may be polyacrylate polyols or polymethacrylate polyols. It is essential to the invention that the at least one poly(meth)acrylate polyol P has an OH number of at least 35, preferably at least 40, especially at least 45, most preferably at least 50. The poly(meth)acrylate polyol P preferably has an OH number of not more than 200, especially not more than 180, most preferably not more than 150.

The parameters of OH number, OH functionality and equivalent weight of polyols are correlated. The OH functionality of a polyol is understood here to mean the average number of OH groups per polyol molecule. These parameters are defined by formulae (I) and (II):

$$\text{Equivalent weight}=(56.1\times 1000)/\text{OH number} \quad (I)$$

$$\text{Equivalent weight}=M_n/\text{OH functionality} \quad (II)$$

where the OH number (hydroxyl number) is defined as the amount of potassium hydroxide in milligrams required to neutralize the amount of acetic acid bound in the acetylation of 1 g of polyol, and $M_n$ is the average molecular weight (number-average) of the polyol. Both formulae (I) and (II) allow calculation of the equivalent weight. The required values for calculation are obtainable by experiment ($M_n$, OH number) or are published by the manufacturer of the polyols ($M_n$, OH functionality).

In addition to these poly(meth)acrylate polyols mentioned and any small amounts of further polyols such as polyoxyalkylene polyols, polyester polyols and polycarbonate polyols, it is also possible to use, in the preparation of the polyurethane polymer PU containing terminal isocyanate groups, small amounts of low molecular weight dihydric or polyhydric alcohols, for example ethane-1,2-diol, propane-1,2-diol and propane-1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3-dimethanol and -1,4-dimethanol, hydrogenated bisphenol A, dimeric fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher polyhydric alcohols, low molecular weight alkoxylation products of the abovementioned dihydric and polyhydric alcohols, and mixtures of the aforementioned alcohols. In preferred embodiments, however, exclusively poly(meth)acrylate polyols are used for preparation of polyurethane polymer PU.

The poly(meth)acrylate polyol P preferably has an average OH functionality of 3.5 to 4.5 and/or an average molecular weight $M_n$, measured by GPC against polystyrene, of 1000 to 4000 g/mol, especially of 1500 to 3500 g/mol, more preferably of 1800 to 2500 g/mol.

Polyisocyanate I1

Polyisocyanates I1 used for the preparation of the polyurethane polymer PU may be commercially available aliphatic or aromatic polyisocyanates, especially diisocyanates and triisocyanates, and oligomeric and polymeric forms of these polyisocyanates.

Suitable examples of polyisocyanate I1 are commercially available aromatic, aliphatic or cycloaliphatic diisocyanates, especially diphenylmethane 4,4'-diisocyanate, optionally with fractions of diphenylmethane 2,4'- and/or 2,2'-diisocyanate (MDI), tolylene 2,4-diisocyanate or mixtures thereof with tolylene 2,6-diisocyanate (TDI), phenylene 1,4-diisocyanate (PDI), naphthalene 1,5-diisocyanate (NDI), hexane 1,6-diisocyanate (HDI), 2,2(4),4-trimethylhexamethylene 1,6-diisocyanate (TMDI), cyclohexane 1,3- or 1,4-diisocyanate, 1-isocyanato-3,3,5-trimethyl-5-isocyanatomethylcyclohexane (isophorone diisocyanate or IPDI), perhydro(diphenylmethane 2,4'- or 4,4'-diisocyanate) (HMDI), 1,3- or 1,4-bis(isocyanatomethyl)cyclohexane, m- or p-xylylene diisocyanate (XDI), or mixtures thereof.

Among these, preference is given to MDI, TDI, HDI or IPDI. Particular preference is given to IPDI.

Very particular preference is given to MDI, especially diphenylmethane 4,4'-diisocyanate (4,4'-MDI). This 4,4'-MDI is especially of a quality that contains only small fractions of diphenylmethane 2,4'- and/or 2,2'-diisocyanate and is solid at room temperature.

The isocyanate groups of the polyurethane polymer PU, in some preferred embodiments, are thus derived from diphenylmethane diisocyanate. Such a polymer cures particularly rapidly and enables particularly high strengths.

Suitable diisocyanate oligomers as polyisocyanate I1 are especially HDI biurets such as Desmodur® N 100 or N 3200 (from Covestro AG), Tolonate® HDB or HDB-LV (from Vencorex) or Duranate® 24A-100 (from Asahi Kasei); HDI isocyanurates such as Desmodur® N 3300, N 3600 or N 3790 BA (all from Covestro), Tolonate® HDT, HDT-LV or HDT-LV2 (from Vencorex), Duranate® TPA-100 or THA-100 (from Asahi Kasei) or Coronate® HX (from Tosoh Corp.); HDI uretdiones such as Desmodur® N 3400 (from Covestro); HDI iminooxadiazinediones such as Desmodur® XP 2410 (from Covestro); HDI allophanates such as Desmodur® VP LS 2102 (from Covestro); IPDI isocyanurates, for example in solution as Desmodur® Z 4470 (from Covestro) or in solid form as Vestanat® T1890/100 (from Evonik Industries); TDI oligomers such as Desmodur® IL (from Covestro); or mixed isocyanurates based on TDI/HDI, such as Desmodur® HL (from Covestro).

Additionally suitable as polyisocyanate I1 are triisocyanates, especially methylidynetri-p-phenyl triisocyanate (triphenylmethane triisocyanate, for example Desmodur® RE), trimers of HDI (for example Desmodur® N-3300 and N-3390), trimers of IPDI, for example Desmodur® Z4470BA, and tris(p-isocyanatophenyl) thiophosphate (for example Desmodur® RFE).

More preferably, polyisocyanate I1 is methylene diphenyl diisocyanate (MDI), oligomeric or polymeric MDI (PMDI) or tris(p-isocyanatophenyl) thiophosphate. Most preferably, polyisocyanate I1 is tris(p-isocyanatophenyl) thiophosphate.

Catalyst

The polyurethane polymer PU containing isocyanate groups is preferably prepared in the presence of a catalyst capable of catalyzing the reaction of the polyisocyanate I with the polyol P. This is preferably a metal catalyst, especially a bismuth, tin or zirconium catalyst.

Suitable metal catalysts which are very well known to the person skilled in the art of polyurethane chemistry are, for example, compounds of titanium, bismuth, zirconium or tin, especially organotin compounds, organobismuthates, organotitanates or organozirconates, where these metal catalysts especially have ligands having alkoxy groups, sulfonate groups, carboxyl groups, dialkyl phosphate groups, dialkyl pyrophosphate groups and diketonate groups. Particular preference is given to tin, bismuth and zirconium catalysts. Compared to other catalysts, for example titanates, these have the advantage that no possibly undesired discolorations occur in the composition.

Suitable catalysts are catalysts for accelerating the reaction of isocyanate groups, in particular organotin(IV) compounds, such as in particular dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, complexes of bismuth (III) or zirconium(IV), in particular with ligands selected from alkoxides, carboxylates, 1,3-diketonates, oxinate, 1,3-ketoesterates, and 1,3-ketoamidates, or compounds containing tertiary amino groups, such as in particular 2,2'-dimorpholinodiethyl ether (DMDEE).

In the preparation of the polyurethane polymer PU, particular preference is given to using a bismuth catalyst, especially a bismuth carboxylate.

In general, the catalyst, which typically remains in the polyurethane polymer PU and hence in the composition after the reaction, may also assume the role of a hydrolysis or crosslinking catalyst for organosilanes OS. This may be advantageous during and after use of the adhesion promoter composition since a substantial acceleration or improvement in adhesion promoter effectiveness may be achieved.

Organosilane OS

The organosilane OS is present in the pretreatment composition in an amount of 0.1 to 10 parts by weight, especially 0.5 to 9 parts by weight, preferably 1 to 8 parts by weight, especially 2.5 to 7 parts by weight, per 10 to 30 parts by weight of the polyurethane polymer PU containing isocyanate groups.

Organosilanes OS enable good adhesion to glass and ceramic substrates and, according to the organic radical, to many other substrates. It is also possible for organosilanes OS, when they an organic radical having a functional group that can react with isocyanate groups (for example amino, hydroxy or mercapto groups), to react with the polyurethane polymer PU and hence create a particularly good adhesive bond.

Suitable organosilanes OS are, for example, hydroxysilanes, epoxysilanes, alkylsilanes, isocyanatosilanes, acrylatosilanes, mercaptosilanes or aminosilanes.

Especially suitable are, for example, the organosilicon compounds selected from the group comprising octyltrimethoxysilane, dodecyltrimethoxysilane, hexadecyltrimethoxysilane, methyloctyldimethoxysilane; 3-glycidyloxypropyltrimethoxysilane, 3-glycidyloxypropyltriethoxysilane; 3-methacryloyloxypropyltrialkoxysilanes, 3-methacryloyloxypropyltriethoxysilane, 3-methacryloyloxypropyltrimethoxysilane; 3-aminopropyltrimethoxysilane, 3-aminopropyltriethoxysilane, 3-aminopropyldimethoxymethylsilane, 3-amino-2-methylpropyltrimethoxysilane, N-(2-aminoethyl)-3-aminopropyltrimethoxysilane, N-(2-aminoethyl)-3-aminopropyltriethoxysilane, N-(2-aminoethyl)-3-aminopropyldimethoxymethylsilane, 4-aminobutyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, [3-(2-aminoethylamino)propyl]trimethoxysilane (=4,7,10-triazadecyltrimethoxysilane), 2-aminoethyltrimethoxysilane, 2-aminoethyldimethoxymethylsilane, aminomethyltrimethoxysilane, aminomethyldimethoxymethylsilane, aminomethylmethoxydimethylsilane, 7-amino-4-oxaheptyldimethoxymethylsilane, N-(methyl)-3-aminopropyltrimethoxysilane, N-(n-butyl)-3-aminopropyltrimethoxysilane; 3-mercaptopropyltriethoxysilane, 3-mercaptopropyltrimethoxysilane, 3-mercaptopropylmethyldimethoxysilane; 3-acylthiopropyltrimethoxysilane; vinyltrimethoxysilane and vinyltriethoxysilane; bis(3-trimethoxysilylpropyl)tetrasulfane, bis(3-methyldimethoxysilylpropyl)tetrasulfane, bis(3-triethoxylsilylpropyl)tetrasulfane, bis(3-methyldiethoxysilylpropyl)tetrasulfane, bis(3-trimethoxysilylpropyl) disulfide, bis(3-methyldimethoxysilylpropyl) disulfide, bis(3-triethoxylsilylpropyl) disulfide and bis(3-methyldiethoxysilylpropyl) disulfides; isocyanuratosilane compounds such as 1,3,5-N-tris(3-trimethoxysilylpropyl)isocyanuratosilane, 1,3,5-N-tris(3-methyldimethoxysilylpropyl)isocyanuratosilane, 1,3,5-N-tris(3-triethoxysilylpropyl)isocyanuratosilane, 1,3,5-N-tris(3-methyldiethoxysilylpropyl)isocyanuratosilane.

Also suitable are the recited organosilicon compounds wherein the alkoxy groups have been replaced by acetoxy groups, for example octyltriacetoxysilane (octyl-Si(O(O=C)CH$_3$)$_3$). Such organosilicon compounds eliminate acetic acid upon hydrolysis.

Likewise suitable are partial hydrolyzates, hydrolyzates and condensates of these recited silanes which are also commercially available as oligomeric organosiloxanes.

Also suitable are hydroxysilanes.

Especially suitable are the organosilicon compounds selected from the group comprising bis[3-(trimethoxysilyl)propyl]amine, bis[3-(triethoxysilyl)propyl]amine, 4,4,15,15-tetraethoxy-3,16-dioxa-8,9,10,11-tetrathia-4,15-disilaoctadecane (bis(triethoxysilylpropyl) polysulfide or bis (triethoxysilylpropyl)tetrasulfane), bis(triethoxysilylpropyl) disulfide.

Especially suitable are also the organosilicon compounds selected from the group comprising tris[3-(trimethoxysilyl)propyl]amine, tris[3-(triethoxysilyl)propyl]amine, 1,3,5-tris[3-(trimethoxysilyl)propyl]-1,3,5-triazine-2,4,6(1H,3H,5H)-trioneurea (=tris(3-(trimethoxysilyl)propyl) isocyanurate) and 1,3,5-tris[3-(triethoxysilyl)propyl]-1,3,5-triazine-2,4,6(1H,3H,5H)-trioneurea (=tris(3-(triethoxysilyl)propyl) isocyanurate).

Preferred organosilanes OS are aminosilanes. Particular preference is given to 3-aminopropyltrimethoxysilane, N-(2-aminoethyl)-3-aminopropyltrimethoxysilane, bis[3-(trimethoxysilyl)propyl]amine, 3-aminopropyltriethoxysilane, N-(2-aminoethyl)-3-aminopropyltriethoxysilane and bis[3-(triethoxysilyl)propyl]amine and mixtures thereof with one another.

The organosilane OS is preferably an aminosilane of the formula (III).

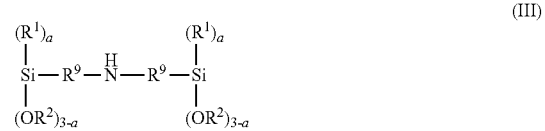

The $R^1$ radical here is an alkyl group having 1 to 8 carbon atoms, especially a methyl group or an ethyl group.

The $R^2$ radical is an alkyl group having 1 to 12 carbon atoms, especially an alkyl group having 2 to 8 carbon atoms, preferably a methyl, ethyl or isopropyl group, most preferably a methyl or ethyl group.

$R^9$ here is independently a divalent, linear or branched, optionally cyclic alkylene group having 1 to 20 carbon atoms, optionally having aromatic components, and optionally having one or more heteroatoms, especially nitrogen atoms.

Examples of suitable organosilanes of the formula (III) are, for example, the organosilanes selected from the group comprising bis[3-(trimethoxysilyl)propyl]amine and bis[3-(triethoxysilyl)propyl]amine.

Examples of suitable hydroxysilanes are those as described in EP2805985 (especially page 2 line 51 to page 3 line 28) and WO 2013/174891 (especially page 6 line 11 to page 8 line 5) and WO 2013/174892 (especially page 6 line 6 to page 7 line 6).

Suitable examples of mercaptosilanes include 3-mercaptopropyltrimethoxysilane, 3-mercaptopropylmethyldimethoxysilane, 3-mercaptopropyltriethoxysilane and 3-mercaptopropylmethyldiethoxysilane.

Particular preference is given to organosilanes OS that have at least one hydrolyzable alkoxysilane group and are selected from the group consisting of aminosilanes, hydroxysilanes, epoxysilanes, mercaptosilanes, isocyanuratosilanes, reaction products of amines and epoxysilanes, reaction products of aminosilanes and epoxides, reaction products of aminosilanes and epoxysilanes, reaction products of isocyanates and aminosilanes, reaction products of isocyanates and hydroxysilanes, tetraalkoxytitanates, dialkoxybisacetylacetonatotitanates, and mixtures, hydrolyzates, partial hydrolyzates and/or condensates of these compounds.

Polyisocyanate I2

Optionally, but preferably in some embodiments, the pretreatment composition of the invention may also contain additional polyisocyanates. If required, these are added together with the organosilane OS and the solvent L after the synthesis of the polyurethane polymer PU in the final formulation of the pretreatment composition, or may already have been present in the synthesis of polyurethane polymer PU. In the context of this description, they are referred to as polyisocyanates I2.

The use of polyisocyanates I2 has the advantage that the processability and especially also the open time of the pretreatment composition are improved. In addition, adhesion on particular substrates is improved once again.

The polyisocyanate I2 is preferably present in the pretreatment composition in an amount of 1 to 10 parts by weight, preferably 2 to 8 parts by weight, especially 3 to 7 parts by weight, per 10 to 30 parts by weight of the polyurethane polymer PU containing isocyanate groups.

Polyisocyanates I2 used may be any polyisocyanates that can be used for polyisocyanate I1. In particular, polyisocyanate I2 may be identical to polyisocyanate I1. In the latter case, an excess of polyisocyanate I1 may be used in the synthesis of polyurethane polymer PU, in which case unconverted polyisocyanate I1 can remain in the reaction mixture as polyisocyanate I2.

The polyisocyanate I2 is preferably selected from the group consisting of methylene diphenyl diisocyanate (MDI), oligomeric or polymeric MDI (PMDI), tris(p-isocyanatophenyl) thiophosphate and oligomeric or polymeric hexamethylene 1,6-diisocyanate (PHDI), and is present in the pretreatment composition in an amount of 1 to 10 parts by weight per 10 to 30 parts by weight of polyurethane polymer PU.

A particularly preferred embodiment of the pretreatment composition of the invention contains:
- 10 to 30 parts by weight, preferably 15 to 25 parts by weight, of polyurethane polymer PU containing isocyanate groups, as described above;
- 0.1 to 10 parts by weight, preferably 2 to 8 parts by weight, of organosilane OS as described above;
- 1 to 10 parts by weight, preferably 2 to 8 parts by weight, of polyisocyanate I2 as described above;
- 60 to 90 parts by weight, preferably 65 to 80 parts by weight, of solvent L as described below.

In specific preferred embodiments of the composition just mentioned, the pretreatment composition consists of these four components, considering any unreacted polyisocyanate I1 present from the synthesis of the polyurethane polymer PU as polyisocyanate I2 and/or likewise counting catalyst as part of the weight of the polyurethane polymer PU.

In specific preferred embodiments of the pretreatment composition of the invention and especially of the composition just mentioned, the organosilane OS is an aminotrialkoxysilane and/or the polyisocyanate I1 is tris(p-isocyanatophenyl) thiophosphate and/or the polyisocyanate I2 is tris(p-isocyanatophenyl) thiophosphate.

Solvent L

In addition, the pretreatment composition of the invention comprises at least one solvent L.

Suitable solvents L include all solvents capable of sufficiently dissolving or at least dispersing the constituents of the binder composition for a stable solution or dispersion to be formed. Furthermore, the solvents L shall not contain any functional groups reactive with isocyanates or alkoxysilanes such as hydroxyl groups. Alcohols are thus not suitable for example.

It is advantageous when the solvent L has comparatively high volatility, i.e. a comparatively low boiling point and/or vapor pressure, in order that rapid evaporation or volatilization of the solvent L takes place after use of the adhesion promoter of the invention. However, it is also possible to use comparatively nonvolatile or high-boiling solvents, but these then need to be removed possibly by a "wipe-off" method (wiping or sucking the solvent away after setting of the binder on the substrate).

It is generally preferable not to use any solvents L that are of high toxicological concern or very high flammability. In these cases the user must ensure that workplace safety is adequately safeguarded, for example through adequate ventilation, personal protective equipment or equipment for avoiding static discharge.

Suitable solvents L are, for example, esters of linear or branched $C_1$ to $C_6$ carboxylic acids, especially mono- or diacids that have been esterified with fatty alcohols or linear or branched $C_1$ to $C_6$ monoalcohols, and esters of low molecular weight alcohols, especially $C_1$ to $C_6$ alcohols that have been esterified with fatty acids, and cyclic forms of such esters. Examples thereof are methyl laurate, ethyl laurate, methyl myristate and lauryl acetate.

Especially suitable esters likewise include esters of carbonic acid or monocarboxylic acids or polycarboxylic acids. Suitable esters of carbonic acid include in particular dialkyl carbonates.

Likewise suitable are esters of carboxylic acids with polyethylene glycols or polypropylene glycols.

Likewise suitable esters are organic phosphonates and phosphates.

Also suitable are cyclic esters, i.e. lactones.

Further suitable solvents L are linear or branched ether compounds having one or two ether functions that bridge $C_2$ to $C_{12}$ alkyl radicals.

Suitable ethers also include in particular alkoxy-terminated polyols, in particular alkoxy-terminated polyoxyalkylene polyols and also alkoxy-terminated polyether polyols. Examples thereof are polypropylene glycol dialkyl ethers or polyethylene glycol dialkyl ethers. Examples thereof are tetraglyme (tetraethylene glycol dimethyl ether), pentaglyme (pentaethylene glycol dimethyl ether), hexaglyme (hexaethylene glycol dimethyl ether), polyethylene glycol dimethyl ether, such as are commercially available for example from Clariant under the name Polyglykol DME 200 or Polyglykol DME 250, diethylene glycol dibutyl ether, polypropylene glycol dimethyl ether, polypropylene glycol dibutyl ether, polyethylene glycol monomethyl ether monoacetate and polypropylene glycol monomethyl ether monoacetate. Compared to the corresponding polyethylene glycol diethers, polypropylene glycol diethers have the advantage that they typically have better dissolution characteristics and are still liquid at higher molecular weights.

Suitable solvents L also include ketones having linear or branched $C_1$ to $C_{12}$ alkyl radicals and amides, in particular fatty acid amides or cyclic amides, i.e. lactams.

The pretreatment composition may also comprise, as solvent L, a carrier medium which is liquid at room temperature and has a boiling point of greater than 250° C. at standard pressure or a vapor pressure of less than 0.1 mbar at 20° C. This type of solvent has the advantage that low-VOC or VOC-free compositions can be formulated. "VOC" stands for volatile organic compounds. Suitable carrier media for low-VOC or VOC-free compositions include plasticizers having a boiling point of greater than 250° C. at standard pressure or a vapor pressure of less than 0.1 mbar at 20° C.

The plasticizers are in particular selected from the group consisting of esters of phthalic acids, esters of aliphatic dicarboxylic acid and fatty acid esters and organic esters of phosphoric acids. Suitable esters of phthalic acids include in particular dialkyl phthalates, preferably the diesters of phthalic acid and $C_8$-$C_{16}$-alcohols, in particular dioctyl phthalate (DOP), diisononyl phthalate (DINP) and diisodecyl phthalate (DIDP).

Esters of aliphatic dicarboxylic acids are in particular the esters of adipic acid or sebacic acid, for example dioctyl adipate (DOA), diisodecyl adipate (DIDA). It is also possible to use polyesters, for example polyesters of adipic acid or sebacic acid with diols, for example hexanediol or butanediol, with the proviso that these polyesters are liquid at room temperature.

However, the proviso applicable to all these compounds used as solvents L is that they must be liquid (free-flowing) at 23° C., preferably at 10° C., in particular at 5° C.

In particularly preferred embodiments of the pretreatment composition of the invention, the solvent L is selected from the group consisting of carboxylic esters, especially methyl acetate, ethyl acetate, butyl acetate, isopropyl acetate, 1-methoxy-2-propyl acetate and 3-methoxy-n-butyl acetate, ketones, especially acetone, butanone, methyl ethyl ketone and methyl isobutyl ketone, acetals, especially ethylal, and aromatic hydrocarbons, especially toluene and ethylbenzene, and from mixtures of these solvents.

The amount of solvent L1 in the binder composition is between 60 and 90 parts by weight, preferably 65 to 80 parts by weight, per 10 to 30 parts by weight of the polyurethane polymer PU containing isocyanate groups.

It may well be advantageous, especially when constituents of the pretreatment composition are insoluble or insufficiently soluble in the solvent L, for surfactants, especially in the form of emulsifiers and/or co-emulsifiers, to be constituents of the pretreatment composition. Such substances are known to a person skilled in the art of solvent-based adhesion promoter compositions.

Further Constituents

The pretreatment composition of the invention may also additionally contain further additives. These especially include organotitanates, industrial carbon black, silicas, especially fumed hydrophobic silicas, UV markers, and further additives that are customary for pretreatment compositions.

Organotitanates may be added as adhesion-promoting additives.

Organotitanates here have at least one substituent bonded to the titanium atom via an oxygen-titanium bond.

Particularly suitable compounds for this purpose are those in which all substituents bonded to the titanium are selected from the group consisting of alkoxy group, sulfonate group, carboxylate group, dialkylphosphate group, dialkylpyrophosphate group and acetylacetonate group, where all substituents may be identical or different.

Particularly suitable carboxylate groups have especially been found to be carboxylates of fatty acids. A preferred carboxylate is decanoate.

Organotitanium compounds suitable as organotitanates in the pretreatment composition of the invention are commercially available, for example, from Kenrich Petrochemicals or DuPont. Examples of suitable organotitanium compounds are for example Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA 01, LICA 09, LICA 12, LICA 38, LICA 44, LICA 97, LICA 99, KR OPPR, KR OPP2 from Kenrich Petrochemicals or Tyzor® ET, IBAY, TBT, TOT TPT, NPT, BTM, AA, AA-75, AA-95, AA-105, TE, ETAM, OGT from DuPont or Dorf Ketal.

Preference is given to Ken-React® KR 7, KR 9S, KR 12, KR 26S, KR 38S, KR44, LICA 09, LICA 44, NZ 44 and Tyzor® ET, IBAY, TBT, TOT, TPT, NPT, BTM, AA, AA-75, AA-95, AA-105, TE, ETAM, OGT from DuPont/Dorf Ketal. Particularly preferred are Tyzor® TBT, Tyzor® OGT and, particularly preferably, Tyzor® IBAY.

It is apparent to the person skilled in the art that these organotitanium compounds undergo hydrolysis under the influence of water and form OH groups bonded to the Ti atom. Such hydrolyzed or partially hydrolyzed organotitanium compounds may themselves undergo condensation to form condensation products comprising Ti—O—Ti bonds. If silanes and/or titanates are mixed in the adhesion promoter mixed condensation products comprising Si—O—Ti bonds are also possible. A small proportion of such condensation products is possible, in particular when they are soluble, emulsifiable or dispersible.

Organotitanates, if present, are typically used in the same amounts as the organosilane OS.

The pretreatment composition may also preferably contain at least one drying agent. Such a drying agent increases the storage stability of the composition by binding any water present and thus inhibiting the unwanted premature hydrolysis and condensation of alkoxysilanes in the container.

Suitable drying agents include, for example, reactive silanes such as tetramethoxysilane, vinyltrimethoxysilane, α-functional silanes such as N-(silylmethyl)-O-methylcarbamates, especially N-(methyldiethoxysilylmethyl)-O-methylcarbamate, (methacryloyloxymethyl)silanes, ethoxymethylsilanes, N-phenyl-, N-cyclohexyl- and N-alkylsilanes, orthoformic esters, calcium oxide or molecular sieves, and isocyanates.

The amount of drying agent in the pretreatment composition, if present, is between 0% and 3% by weight, preferably between 0.5% and 2% by weight, based on the overall pretreatment composition.

It may further be advantageous for the pretreatment composition to contain a filler. The filler may be inorganic or organic. It is particularly advantageous when the filler comprises a particle diameter of less than 100 micrometers, in particular of less than 1 micrometer. Particular preference is given to carbon blacks, chalk, in particular coated chalks, and different types of silicon dioxide, such as quartz flour, colloidal or fumed silicas, preferably fumed silicas, most preferably fumed hydrophobic silicas. Industrial carbon black is the most preferred filler. This filler results in a particularly good UV resistance of the adhesive bond which is advantageous for example for adhesive bonding of windows and automotive glazing. Preferred amounts of filler, in particular industrial carbon black, are 0% to 30% by weight, in particular 5% to 20% by weight, preferably 7% to 15% by weight, based on the total adhesion promoter composition.

Any filler present is preferably present in the pretreatment composition in an amount of 0.1 to 15 parts by weight, especially 0.5 to 10 parts by weight, per 10 to 30 parts by weight of the polyurethane polymer PU containing isocyanate groups.

A preferred amount of industrial carbon black in the composition is especially 0.1 to 15 parts by weight, preferably 0.5 to 10 parts by weight, per 10 to 30 parts by weight of the polyurethane polymer PU containing isocyanate groups. A preferred amount of fumed hydrophobic silica in the composition is especially 0.1 to 10 parts by weight, preferably 0.5 to 7.5 parts by weight, per 10 to 30 parts by weight of the polyurethane polymer PU containing isocyanate groups.

The use of fillers is additionally especially suitable for the mechanical reinforcement of the pretreatment composition. The use of fillers further makes it possible to realize relatively thick-film applications.

A particularly preferred embodiment of the pretreatment composition according to this invention is free of fillers, especially free of industrial carbon black and fumed hydrophobic silica. It is thus possible in a simple manner to create clear, transparent and largely colorless pretreatment compositions that have the advantage especially over soot-containing pretreatment compositions of not leaving any visible traces after use.

If the pretreatment composition is a primer, it may be advantageous when at least one organic film former is additionally used. This may, for example, be an epoxy resin or poly(meth)acrylate.

The composition may additionally also include further constituents. These are especially pigments, dyes, UV markers, fluorescence indicators, flow additives, biocides, in particular algicides or fungicides, thixotropic agents, flame retardants and stabilizers.

Especially preferably, the pretreatment composition of the invention contains a UV marker. This is a substance which becomes visible under UV light. The use of such a substance has the advantage that, after application of transparent pretreatment compositions, it is possible to check where exactly the composition has been applied and/or where the adhesive is to be applied.

The pretreatment compositions of the invention can be used in various ways. In a particularly preferred embodiment, they are a primer or an adhesion-promoting undercoat.

In a further aspect the present invention relates to a method of adhesive bonding or of sealing. This method comprises the following steps:
i) applying a pretreatment composition as described above to a substrate S1 to be adhesively bonded or sealed;
ii) preferably flashing off the pretreatment composition applied, such that the pretreatment composition forms a film on the substrate S1;
iii) applying an adhesive or sealant to the film that has been formed from the pretreatment composition and is present on the substrate S1;
iv) contacting the adhesive or sealant with a second substrate S2, the second substrate optionally likewise having been treated beforehand with the same or a different pretreatment composition.

The adhesive or sealant used in the method just mentioned may in principle be any commercial adhesive or sealant. The selection is guided by factors including the open time and the mechanical demands on the bond formed. It has been found that this method is especially suitable for polyurethane adhesives or sealants, in particular for polyurethane adhesives containing at least one isocyanate-comprising polyurethane prepolymer. Such polyurethane adhesives cure under the influence of atmospheric humidity via a crosslinking reaction of the isocyanate groups and are commercially widely available, especially under the name Sikaflex®, SikaTack® or SikaBond® from Sika Schweiz AG. The adhesion promoter composition is likewise of particularly good suitability for silane-terminated (silane-functional) adhesives and sealants, these likewise being obtainable, for example under the Sikaflex® or SikaBond® name, from Sika Schweiz AG.

Step iii) may be preceded, if need be, by a step of wiping with a dry cloth (often referred to as "wipe-off" in the art).

Application of the adhesive or sealant may be deferred until the adhesion promoter composition has flashed off. However, it has been found that, surprisingly, the adhesive or sealant may in most cases be applied directly to the still-moist adhesion promoter composition film, i.e. "wet-on-wet", without this resulting in any noticeable disadvantages in terms of the adhesion or mechanical properties of the cured sealant or adhesive. A suitable and preferred flashoff time for step ii) is between 1 and 20 min, preferably between 2 and 15 min, especially between 3 and 10 min. The flashoff temperature is surprisingly not very important here.

The substrate S1 may be identical or different to substrate S2.

Suitable substrates S1 or S2 are for example inorganic substrates such as glass, glass ceramic, concrete, mortar, brick, tile, gypsum and natural stones such as granite or marble; metals or alloys such as aluminum, steel, nonferrous metals, galvanized metals; organic substrates such as wood, plastics such as PVC, polycarbonates, PMMA, polyesters, epoxy resins; coated substrates such as powder-coated metals or alloys; and paints and lacquers. Especially preferred substrates S1 or S2 are glass, glass ceramic, aluminum and paints, especially in the form of automotive paint.

If required, the substrates may additionally be treated prior to the application of the pretreatment or of the adhesive or sealant. Such additional pretreatments especially include physical and/or chemical cleaning processes, for example sanding, sandblasting, brushing or the like, or treating with detergents or solvents.

In preferred embodiments of the method just described, the substrate S1 comprises the residual bead of a previously partly removed, old cured adhesive, metal or painted metal, and substrate S2 comprises glass, metal, painted metal or ceramic.

In the same or other preferred embodiments of the method just described, the adhesive or sealant described is a polyurethane adhesive that contains at least one polyurethane prepolymer having isocyanate groups or an adhesive based on silane-functional polymers.

Such a method of adhesive bonding or of sealing results in an article. Since the method may be widely employed, for example in industrial manufacturing or in civil engineering or structural engineering, this article may also vary very widely in nature.

In a further aspect, the present invention thus relates to an article produced using a method as described above.

Said article is in particular an article which is a built structure, an industrial good or a means of transport. It is in particular a building, or a part thereof. Or the article is in particular a means of transport, especially an automobile, bus, truck, rail vehicle, ship or aircraft.

EXAMPLES

The present invention is elucidated further hereinafter via experimental examples.
Polyols P Used for the Preparation of Polyurethane Polymer PU The polyols in table 1 were used as polyol P for the production of the illustrative isocyanate-containing polyurethane polymers PU.

TABLE 1

Polyols P used.

| Name (manufacturer) | Category | OH number |
|---|---|---|
| Joncryl 963 (BASF) | Poly(meth)acrylate polyol | 130 |
| Arufon UH-2000 (Toagosei) | Poly(meth)acrylate polyol | 20 |
| Synthalat A-TS 3737 (Synthopol) | Poly(meth)acrylate polyol | 100 |
| Setalux D A 160 (Nuplex) | Poly(meth)acrylate polyol | 90 |
| Arufon UH-2041 (Toagosei) | Poly(meth)acrylate polyol | 120 |
| Arufon UH-2190 (Toagosei) | Poly(meth)acrylate polyol | 32 |
| Desmophen 670 BA (Covestro) | Polyester polyol | 145 |
| Baycoll AD 2047 (Covestro) | Polyester polyol | 55 |
| Desmpohen C 1100 (Covestro) | Polycarbonate polyol | 109 |

TABLE 2

Further raw materials used.

| Name (manufacturer) | Function | Chemical name |
|---|---|---|
| Silquest A1170 (Momentive) | Organosilane OS | Bis(trimethoxysilylpropyl)amine |

TABLE 2-continued

Further raw materials used.

| Name (manufacturer) | Function | Chemical name |
|---|---|---|
| Coscat 83 (Vertellus) | Catalyst | Bismuth carboxylate |
| Desmodur RFE (Covestro) | Polyisocyanate 11 | Tris(p-isocyanatophenyl) thiophosphate (27% by weight in ethyl acetate) |
| Ethyl acetate (Sigma Aldrich) | Solvent L | Ethyl acetate |

Further Raw Materials Used

The raw materials of table 2 were additionally used for the production of the example compositions.

Production of Pretreatment Composition C1 (Noninventive)

To an initial charge of 57 parts by weight of Desmodur RFE in a vat was then added 43 parts by weight of Arufon UH-2000 while stirring. Thereafter, 0.01 part by weight of Coscat 83 was added. The mixture was heated to 60° C. and left to react over the course of 8 h. The reaction was stopped once the measurement of free NCO groups (determined via titration) remained stable. 34.26 parts by weight of the reaction mixture obtained was diluted with 65.74 parts by weight of ethyl acetate, and 5 parts by weight of Silquest A1170 was added to 95 parts by weight of this diluted mixture. The result was a homogeneous, clear pretreatment composition with solids content about 25%.

Production of Pretreatment Composition C2 (Inventive)

To an initial charge of 81.7 parts by weight of Desmodur RFE in a vat was then added 18.3 parts by weight of Synthalat A-TS 3737 (70% by weight in butyl acetate) while stirring. The mixture was heated to 60° C. and left to react over the course of 8 h. The reaction was stopped once the measurement of free NCO groups remained stable.

57 parts by weight of the reaction mixture obtained was diluted with 38 parts by weight of ethyl acetate, and 5 parts by weight of Silquest A1170 was then added. The result was a homogeneous, clear pretreatment composition with solids content about 25%.

Production of Pretreatment Composition C3 (Inventive)

To an initial charge of 87 parts by weight of Desmodur RFE in a vat was then added 13 parts by weight of Setalux D A 160 (60% by weight in xylene) while stirring. The mixture was heated to 60° C. and left to react over the course of 8 h. The reaction was stopped once the measurement of free NCO groups remained stable.

80 parts by weight of the reaction mixture obtained was diluted with 20 parts by weight of ethyl acetate. Then 5 parts by weight of Silquest A1170 was added to 95 parts by weight of this diluted mixture. The result was a homogeneous, clear pretreatment composition with solids content about 29.5%.

Production of Pretreatment Composition C4 (Inventive)

To an initial charge of 88.5 parts by weight of Desmodur RFE in a vat was then added 11.5 parts by weight of Arufon UH-2041 while stirring. The mixture was heated to 60° C. and left to react over the course of 8 h. The reaction was stopped once the measurement of free NCO groups remained stable. 56.5 parts by weight of the reaction mixture obtained was diluted with 43.5 parts by weight of ethyl acetate, and 5 parts by weight of Silquest A1170 was added to 95 parts by weight of this diluted mixture. The result was a homogeneous, clear pretreatment composition with solids content about 25%.

Production of Pretreatment Composition C5 (Noninventive)

To an initial charge of 68 parts by weight of Desmodur RFE in a vat was then added 32 parts by weight of Arufon UH-2190 while stirring. The mixture was heated to 60° C. and left to react over the course of 8 h. The reaction was stopped once the measurement of free NCO groups remained stable.

39.68 parts by weight of the reaction mixture obtained was diluted with 60.32 parts by weight of ethyl acetate, and 5 parts by weight of Silquest A1170 was added to 95 parts by weight of this diluted mixture. The result was a homogeneous, clear pretreatment composition with solids content about 25%.

Production of Pretreatment Composition C6 (Noninventive)

To an initial charge of 82 parts by weight of Desmodur RFE in a vat was then added 18 parts by weight of Desmophen 670 BA (80% by weight in butyl acetate) while stirring. The mixture was heated to 60° C. and left to react over the course of 8 h. The reaction was stopped once the measurement of free NCO groups remained stable.

80.3 parts by weight of the reaction mixture obtained was diluted with 19.7 parts by weight of ethyl acetate, and 5 parts by weight of Silquest A1170 was added to 95 parts by weight of this diluted mixture. The result was a homogeneous, clear pretreatment composition with solids content about 30%.

Production of Pretreatment Composition C7 (Noninventive)

To an initial charge of 65 parts by weight of Desmodur RFE in a vat was then added 35 parts by weight of Baycoll AD 2047 while stirring. The mixture was heated to 60° C. and left to react over the course of 8 h. The reaction was stopped once the measurement of free NCO groups remained stable.

38.05 parts by weight of the reaction mixture obtained was diluted with 61.95 parts by weight of ethyl acetate, and 5 parts by weight of Silquest A1170 was added to 95 parts by weight of this diluted mixture. The result was a homogeneous, clear pretreatment composition with solids content about 42.5%.

Production of Pretreatment Composition C8 (Inventive)

To an initial charge of 89.12 parts by weight of Desmodur RFE in a vat was then added 10.87 parts by weight of Joncryl 963 while stirring. Thereafter, 0.01 part by weight of Coscat 83 was added. The mixture was heated to 60° C. and left to react over the course of 8 h. The reaction was stopped once the measurement of free NCO groups remained stable. 57.24 parts by weight of the reaction mixture obtained was diluted with 42.76 parts by weight of ethyl acetate, and 5 parts by weight of Silquest A1170 was added to 95 parts by weight of this diluted mixture. The result was a homogeneous, clear pretreatment composition with solids content about 23.5%.

Production of Pretreatment Composition C9 (Inventive)

460 g of Joncryl® 963 and 540 g of diphenylmethane 4,4'-diisocyanate (Desmodur® 44 MC L, from Covestro) were reacted by a known method at 80° C. to give a poly(meth)acrylate urethane polymer having an NCO content of 14.0% by weight, a viscosity of 14.7 Pa·s at 20° C. and a monomeric diphenylmethane 4,4'-diisocyanate content of about 33% by weight. Subsequently, the volatile constituents, especially the majority of the monomeric diphenylmethane 4,4'-diisocyanate, were removed by distillation in a short-path evaporator (jacket temperature 180° C., pressure 0.1 to 0.005 mbar, condensation temperature 47° C.). The poly(meth)acrylate urethane polymer thus obtained had an NCO content of 4.8% by weight, a viscosity of 50.7 Pa·s at 60° C. and a monomeric diphenylmethane 4,4'-diisocyanate content of 0.12% by weight.

15.0 parts by weight of the reaction mixture obtained was diluted with 85.0 parts by weight of ethyl acetate, and 5 parts by weight of Silquest A1170 was added to 95 parts by weight of this diluted mixture. The result was a homogeneous, clear pretreatment composition with solids content about 37%.

Production of Pretreatment Composition C10 (Noninventive)

To an initial charge of 89.12 parts by weight of Desmodur RFE in a vat was then added 10.87 parts by weight of Joncryl 963 while stirring. Thereafter, 0.01 part by weight of Coscat 83 was added. The mixture was heated to 60° C. and left to react over the course of 8 h. The reaction was stopped once the measurement of free NCO groups remained stable. 57.24 parts by weight of the reaction mixture obtained was diluted with 42.76 parts by weight of ethyl acetate. The result was a homogeneous, clear pretreatment composition with solids content about 20%.

Pretreatment compositions C1 to C10 were placed into tightly sealable glass bottles and, after storage at room temperature for 1 day, used for the adhesion tests.

Production of Pretreatment Composition C11 (Noninventive)

To an initial charge of 80 parts by weight of Desmodur RFE in a vat was then added 20 parts by weight of Desmophen C 1100 while stirring. Thereafter, 0.01 part by weight of Coscat 83 was added. The mixture was heated to 60° C. and left to react over the course of 8 h. The reaction was stopped once the measurement of free NCO groups remained stable. 96 parts by weight of the reaction mixture obtained was diluted with 55 parts by weight of ethyl acetate. The result was a homogeneous, clear pretreatment composition with solids content about 29%.

Production of Pretreatment Composition C12 (Noninventive)

To an initial charge of 88 parts by weight of Desmodur RFE in a vat was then added 12 parts by weight of Desmophen C 1100 while stirring. Thereafter, 0.01 part by weight of Coscat 83 was added. The mixture was heated to 60° C. and left to react over the course of 8 h. The reaction was stopped once the measurement of free NCO groups remained stable. 96 parts by weight of the reaction mixture obtained was diluted with 37 parts by weight of ethyl acetate. The result was a homogeneous, clear pretreatment composition with solids content about 28%.

Adhesion Test of Adhesion Promoter Compositions

The pretreatment compositions produced were then respectively applied to an air side and a tin side of a float glass substrate, and to the ceramic substrates specified below, by means of a cellulose cloth soaked therewith (Tela®, Tela-Kimberly Switzerland GmbH).

Ceramic Substrates Used:

| | |
|---|---|
| "JM 1PBL3020" | Johnson Matthey 1PBL3020 automotive glass enamel frit |
| "Ferro 14303" | Ferro 14 303 IR-7134 high durable windshield enamel frit |
| "Ferro 14316" | Ferro 14 316 IR-7363 high durable windshield enamel frit |
| "JM IL5350" | Johnson Matthey IL5350-WF734 automotive enamel frit |
| "Ferro 14633" | Ferro 14 633 IR-7355 automotive glass enamel frit |
| "Ferro 14531" | Ferro 14 531 IR-7344 automotive glass enamel frit |
| "Ferro 14251" | Ferro 14 251 automotive glass enamel frit |

All float glass and ceramic substrates were sourced from Rocholl AG, Germany.

All substrates were cleaned immediately prior to application of the adhesion promoter composition by wiping using a cellulose cloth (Tela®) that had been soaked with an isopropanol/water mixture (2:1) and flashed off for at least 2 minutes prior to the application of the pretreatment composition.

After application according to the conditions in the tables (time, temperature, relative air humidity), the respective pretreatment composition was flashed off, and then a round bead of a SikaTack® Drive adhesive was applied by means of expression cartridge and nozzle. SikaTack® Drive is a one-component moisture-curable polyurethane adhesive which contains polyurethane prepolymers having isocyanate groups but no adhesion promoters and is commercially available from Sika Schweiz AG. SikaTack® Drive is an adhesive specifically used for glazing replacement bonds in vehicles.

The adhesive was tested for adhesion after a curing time of 7 days of storage in a room under standard climatic conditions (23° C., 50% rel. humidity) ("7 d NC"), and after subsequent exposure to water ("7 d $H_2O$") in water at 23° C. for 7 days, and after subsequent exposure to heat for one day at 80° C. in an oven ("1 d 80° C."), and after subsequent exposure to hot and humid conditions ("7 d KPL") for 7 days at 70° C., 100% rel. humidity.

The adhesion of the adhesive was tested using the 'bead adhesion test'. This involves cutting into the bead at its end just above the adhesive bonding surface. The cut end of the bead is held with round-nose pliers and pulled away from the substrate. This is done by carefully rolling up the bead onto the tip of the pliers, and making a cut at right angles to the bead pulling direction down to the bare substrate. The bead pulling speed should be chosen such that a cut has to be made about every 3 seconds. The test distance must correspond to at least 8 cm. What is assessed is the adhesive remaining on the substrate after the bead has been pulled away (cohesion fracture). The adhesion properties are assessed by visual determination of the cohesive fraction of the bonding area.

The higher the proportion of cohesive failure the better the adhesive bonding. Test results with cohesion fractures of less than 70% are typically considered to be inadequate. The results are summarized in tables 3 to 7. The numbers shown in the tables describe the percentage of cohesive fracture.

Adhesion to residual adhesive beads was determined on cured and aged adhesive layers as bonding substrate. For this purpose, in each case, a commercially available polyurethane adhesive for bonding of panes (Sikaflex®-250 SV-3, from Sika Automotive Hamburg GmbH, and also Sikaflex®-250 DM-6, from Sika Automotive Hamburg GmbH, and also SikaTack® PRO, from Sika Schweiz AG) was applied in the form of a triangular bead of width about 8 mm and height about 10 mm to a glass body, covered with a silicone-coated release paper, pressed to a layer thickness of about 5 mm and cured under standard climatic conditions for 7 days, the release paper was removed and the compressed adhesive bead was aged at 80° C. for 14 days. Some substrates were additionally subjected to hot and humid conditions for 7 days. Subsequently, the cured and aged adhesive bead was cut away from the glass body down to a layer thickness of about 1 mm. In addition, an automotive paint substrate was used.

Thereafter, under standard climatic conditions, the respective pretreatment composition, as described above for the adhesion tests, was applied to the respective residual bead substrate (or automotive paint substrate) and flashed off.

The adhesive used for testing of adhesion was again SikaTack® Drive as described above. The adhesive was applied in the form of a triangular bead of width about 8 mm and height about 10 mm to strips of silicone-coated release paper. Subsequently, the triangular beads applied to the release paper were upturned and placed onto the residual adhesive bead remaining on the glass body in such a way that the release paper was on top and the composition was in contact with the residual adhesive bead. Subsequently, the composition was pressed to a layer thickness of about 5 mm and cured under standard climatic conditions for 7 d, then the release paper was removed and the adhesion of the cured composition on the residual adhesive bead was tested by making an incision into the cured composition at the narrow end just above the bond surface, holding the incised end of the composition with rounded tweezers and attempting to pull the composition away from the substrate (=residual adhesive bead). Then the composition was incised again down to the substrate, the part that had been cut away was rolled up with the rounded tweezers and an attempt was again made to pull the composition away from the substrate. In this way, the composition was cut away from the substrate by pulling. Subsequently, the fracture profile was used to assess the adhesion as described further up for the other adhesion tests.

The results of the adhesion tests of residual adhesive beads and automotive paint are shown in table 8. A datum "n/m" in the table means that this value was not measured.

TABLE 3

Adhesion tests on float glass and ceramic substrates.

| | | Pretreatment composition | | | | |
|---|---|---|---|---|---|---|
| | | C1 (ref.) | C2 | C3 | C2 | C3 |
| | | | Flashoff conditions (time, temperature, rel. air humidity) | | | |
| Substrate | Storage | 5 min, 23° C., 50% r. h. | 3 min, 23° C., 50% r. h. | | 3 min, −10° C. | |
| Float glass (tin side) | 7 d NC | 0 | 100 | 100 | 100 | 100 |
| | 7 d H$_2$O | 0 | 100 | 100 | 100 | 100 |
| | 1 d 80° C. | 0 | 100 | 100 | 100 | 100 |
| | 7 d KPL | 0 | 100 | 100 | 100 | 100 |
| Float glass (air side) | 7 d NC | 0 | 100 | 100 | 100 | 100 |
| | 7 d H$_2$O | 0 | 90 | 100 | 100 | 100 |
| | 1 d 80° C. | 0 | 100 | 100 | 100 | 100 |
| | 7 d KPL | 0 | 100 | 100 | 100 | 100 |
| JM 1PBL3020 | 7 d NC | 0 | 100 | 100 | 100 | 100 |
| | 7 d H$_2$O | 0 | 100 | 100 | 100 | 100 |
| | 1 d 80° C. | 0 | 100 | 100 | 100 | 100 |
| | 7 d KPL | 0 | 100 | 100 | 100 | 100 |
| Ferro 14303 | 7 d NC | 0 | 100 | 100 | 100 | 100 |
| | 7 d H$_2$O | 0 | 100 | 100 | 100 | 100 |
| | 1 d 80° C. | 0 | 100 | 100 | 100 | 100 |
| | 7 d KPL | 0 | 100 | 100 | 100 | 100 |

TABLE 4

Adhesion tests on ceramic substrates.

| | | Pretreatment composition | | | | |
|---|---|---|---|---|---|---|
| | | C1 (ref.) | C2 | C3 | C2 | C3 |
| | | | Flashoff conditions (time, temperature, rel. air humidity) | | | |
| Substrate | Storage | 5 min, 23° C., 50% r. h. | 3 min, 23° C., 50% r. h. | | 3 min, −10° C. | |
| Ferro 14316 | 7 d NC | 0 | 100 | 100 | 100 | 100 |
| | 7 d H$_2$O | 0 | 100 | 100 | 100 | 100 |
| | 1 d 80° C. | 0 | 100 | 100 | 100 | 100 |
| | 7 d KPL | 0 | 100 | 100 | 100 | 100 |
| JM IL5350 | 7 d NC | 0 | 100 | 100 | 100 | 100 |
| | 7 d H$_2$O | 0 | 100 | 100 | 100 | 100 |
| | 1 d 80° C. | 0 | 100 | 100 | 100 | 100 |
| | 7 d KPL | 0 | 100 | 100 | 100 | 100 |
| Ferro 14633 | 7 d NC | 0 | 100 | 100 | 100 | 100 |
| | 7 d H$_2$O | 0 | 100 | 100 | 100 | 100 |
| | 1 d 80° C. | 0 | 100 | 100 | 100 | 100 |
| | 7 d KPL | 0 | 100 | 100 | 100 | 100 |
| Ferro 14531 | 7 d NC | 0 | 100 | 100 | 100 | 100 |
| | 7 d H$_2$O | 0 | 100 | 100 | 100 | 100 |
| | 1 d 80° C. | 0 | 100 | 100 | 100 | 100 |
| | 7 d KPL | 0 | 100 | 100 | 100 | 100 |

TABLE 5

Adhesion tests on float glass and ceramic substrates.

| Substrate | Storage | Pretreatment composition |  |  |  |  |  |
|---|---|---|---|---|---|---|---|
| | | \_\_\_ Flashoff conditions (time, temperature, rel. air humidity) \_\_\_ | | | | | |
| | | 3 min, 23° C., 50% r. h. | | 3 min, −10° C. | | 10 min, −10° C. | |
| | | C4 | C5 (ref.) | C4 | C5 (ref.) | C4 | C5 (ref.) |
| Float glass (tin side) | 7 d NC | 100 | 100 | 100 | 95 | 100 | 0 |
| | 7 d H₂O | 80 | 50 | 100 | 100 | 100 | 95 |
| | 1 d 80° C. | 100 | 100 | 100 | 100 | 100 | 100 |
| | 7 d KPL | 100 | 90 | 100 | 90 | 100 | 90 |
| Float glass (air side) | 7 d NC | 100 | 100 | 100 | 100 | 100 | 100 |
| | 7 d H₂O | 80 | 95 | 100 | 100 | 100 | 100 |
| | 1 d 80° C. | 100 | 100 | 100 | 100 | 100 | 100 |
| | 7 d KPL | 100 | 95 | 100 | 90 | 100 | 100 |
| JM 1PBL3020 | 7 d NC | 100 | 100 | 100 | 70 | 100 | 20 |
| | 7 d H₂O | 100 | 70 | 100 | 10 | 100 | 0 |
| | 1 d 80° C. | 100 | 100 | 100 | 100 | 100 | 20 |
| | 7 d KPL | 100 | 50 | 100 | 100 | 100 | 80 |
| Ferro 14303 | 7 d NC | 100 | 0 | 100 | 20 | 100 | 20 |
| | 7 d H₂O | 100 | 20 | 100 | 10 | 100 | 20 |
| | 1 d 80° C. | 100 | 100 | 100 | 10 | 100 | 100 |
| | 7 d KPL | 100 | 100 | 100 | 10 | 100 | 30 |

TABLE 6

Adhesion tests on ceramic substrates.

| Substrate | Storage | Pretreatment composition |  |  |  |  |  |
|---|---|---|---|---|---|---|---|
| | | \_\_\_ Flashoff conditions (time, temperature, rel. air humidity) \_\_\_ | | | | | |
| | | 3 min, 23° C., 50% r. h. | | 3 min, −10° C. | | 10 min, −10° C. | |
| | | C4 | C5 (ref.) | C4 | C5 (ref.) | C4 | C5 (ref.) |
| Ferro 14316 | 7 d NC | 100 | 70 | 100 | 0 | 100 | 95 |
| | 7 d H₂O | 100 | 0 | 100 | 0 | 100 | 90 |
| | 1 d 80° C. | 100 | 95 | 100 | 0 | 100 | 100 |
| | 7 d KPL | 100 | 70 | 100 | 10 | 100 | 100 |
| JM IL5350 | 7 d NC | 100 | 100 | 100 | 100 | 100 | 30 |
| | 7 d H₂O | 100 | 100 | 100 | 100 | 100 | 0 |
| | 1 d 80° C. | 100 | 100 | 100 | 100 | 100 | 0 |
| | 7 d KPL | 100 | 100 | 100 | 100 | 100 | 0 |
| Ferro 14633 | 7 d NC | 100 | 80 | 100 | 0 | 100 | 30 |
| | 7 d H₂O | 100 | 100 | 100 | 0 | 100 | 0 |
| | 1 d 80° C. | 100 | 100 | 100 | 30 | 100 | 0 |
| | 7 d KPL | 100 | 100 | 100 | 0 | 100 | 20 |
| Ferro 14531 | 7 d NC | 100 | 80 | 100 | 100 | 80 | 100 |
| | 7 d H₂O | 90 | 70 | 100 | 80 | 100 | 95 |
| | 1 d 80° C. | 100 | 100 | 100 | 100 | 100 | 100 |
| | 7 d KPL | 100 | 90 | 100 | 100 | 100 | 80 |

TABLE 7

Adhesion tests on float glass and ceramic substrates.

| | | Pretreatment composition | | | | | | | |
|---|---|---|---|---|---|---|---|---|---|
| | | C6 (ref.) | C7 (ref.) | C8 | C7 (ref.) | C8 | C10 (ref.) | C11 (ref.) | C12 (ref.) |
| | | Flashoff conditions (time, temperature, rel. air humidity) | | | | | | | |
| Substrate | Storage | 10 min, 18° C., 25% r. h. | | | 10 min, 5° C., 80% r. h. | | 10 min, 23° C., 25% r. h. | | |
| Float glass (tin side) | 7 d NC | 0 | 0 | 100 | 10 | 100 | 0 | 0 | 0 |
| | 7 d H$_2$O | 0 | 80 | 100 | 100 | 100 | 0 | 0 | 0 |
| | 1 d 80° C. | 100 | 100 | 100 | 100 | 100 | 0 | 0 | 0 |
| | 7 d KPL | 100 | 100 | 100 | 100 | 100 | 0 | 0 | 0 |
| Float glass (air side) | 7 d NC | 80 | 0 | 100 | 60 | 100 | 0 | 0 | 50 |
| | 7 d H$_2$O | 0 | 90 | 100 | 60 | 100 | 0 | 0 | 20 |
| | 1 d 80° C. | 100 | 100 | 100 | 100 | 100 | 0 | 0 | 90 |
| | 7 d KPL | 100 | 100 | 100 | 100 | 100 | 0 | 0 | 0 |
| Ferro 14251 | 7 d NC | 70 | 0 | 100 | 40 | 100 | 0 | 0 | 0 |
| | 7 d H$_2$O | 30 | 90 | 100 | 100 | 100 | 0 | 0 | 0 |
| | 1 d 80° C. | 100 | 100 | 100 | 100 | 100 | 0 | 0 | 0 |
| | 7 d KPL | 100 | 100 | 100 | 100 | 100 | 0 | 0 | 0 |

TABLE 8

Adhesion tests on residual adhesive beads and automotive paint.

| | | Pretreatment composition | | | | |
|---|---|---|---|---|---|---|
| | | C2 | C3 | C8 | C9 | C10 (ref.) |
| | | Flashoff conditions (time, temperature, rel. air humidity) | | | | |
| Residual adhesive bead | Storage | 5 min, 23° C., 50% r. h. | | | | |
| Sikaflex-250 SV-3 | 14 d 80° C. | 100 | 100 | 100 | 100 | 100 |
| | +7 d KPL | 100 | 100 | 100 | 100 | 100 |
| Sikaflex-250 DM-6 | 14 d 80° C. | 100 | 100 | 100 | 100 | 100 |
| | +7 d KPL | 100 | 100 | 100 | 100 | 70 |
| SikaTack PRO | 14 d 80° C. | 100 | 100 | 100 | 100 | 100 |
| | +7 d KPL | 100 | 100 | 100 | 100 | 100 |
| Automotive paint (without residual adhesive bead) | 7 d NC | 100 | 100 | 100 | n/m | n/m |
| | 7 d H$_2$O | 100 | 100 | 100 | n/m | n/m |
| | 1 d 80° C. | 100 | 100 | 100 | n/m | n/m |

The invention claimed is:

1. A pretreatment composition for adhesive bonds, comprising
   i) between 10 and 30 parts by weight of at least one polyurethane polymer PU containing isocyanate groups, obtained from the reaction of at least one poly(meth)acrylate polyol P and at least one polyisocyanate I1, with the proviso that the poly(meth)acrylate polyol P has an OH number of at least 35 and the polyurethane polymer PU has an NCO content of between 2.0% and 25.0% by weight, based on the polyurethane polymer PU;
   ii) 0.1 to 10 parts by weight of at least one organosilane OS;
   iii) 1 to 10 parts by weight of at least one further polyisocyanate I2;
   iv) 60 to 90 parts by weight of a solvent L;
   v) 0 to 15 parts by weight of an industrial carbon black;
   vi) 0 to 10 parts by weight of a fumed hydrophobic silica.

2. The pretreatment composition as claimed in claim 1, wherein the polyurethane polymer PU has a residual content of unreacted polyisocyanate I1 of <0.5% by weight, based on the polyurethane polymer PU.

3. The pretreatment composition as claimed in claim 1, wherein the poly(meth)acrylate polyol P has an average OH functionality of 3.5 to 4.5 and/or an average molecular weight $M_n$, measured by GPC against polystyrene, of 1000 to 4000 g/mol.

4. The pretreatment composition as claimed in claim 1, wherein the organosilane OS comprises at least one hydrolyzable alkoxysilane group and is selected from the group consisting of aminosilanes, hydroxysilanes, epoxysilanes, mercaptosilanes, isocyanuratosilanes, reaction products of amines and epoxysilanes, reaction products of aminosilanes and epoxides, reaction products of aminosilanes and epoxysilanes, reaction products of isocyanates and aminosilanes, reaction products of isocyanates and hydroxysilanes, and mixtures, hydrolyzates, partial hydrolyzates and/or condensates of these compounds.

5. The pretreatment composition as claimed in claim 1, wherein the polyisocyanate I1 is methylene diphenyl diisocyanate (MDI), oligomeric or polymeric MDI (PMDI) or tris(p-isocyanatophenyl) thiophosphate.

6. The pretreatment composition as claimed in claim 1, wherein the pretreatment composition is free of industrial carbon black and fumed hydrophobic silica.

7. The pretreatment composition as claimed in claim 1, wherein the polyisocyanate I2 is selected from the group consisting of methylene diphenyl diisocyanate (MDI), oligomeric or polymeric MDI (PMDI), tris(p-isocyanatophenyl) thiophosphate and oligomeric or polymeric hexamethylene 1,6-diisocyanate (PHDI).

8. The pretreatment composition as claimed in claim 1, wherein the organosilane OS is an aminotrialkoxysilane and/or the polyisocyanate I1 is tris(p-isocyanatophenyl) thiophosphate and/or the polyisocyanate I2 is tris(p-isocyanatophenyl) thiophosphate.

9. The pretreatment composition as claimed in claim 1, wherein the solvent L is selected from the group consisting of carboxylic esters, ketones, acetals, and aromatic hydrocarbons, and from mixtures of these solvents.

10. The pretreatment composition as claimed in claim 1, wherein a bismuth catalyst is used in the preparation of the polyurethane polymer PU.

11. The pretreatment composition as claimed in claim 1, wherein the polyurethane polymer PU is obtained:

either from the reaction of tris(p-isocyanatophenyl) thiophosphate with a poly(meth)acrylate polyol, where the poly(meth)acrylate polyol has an average OH functionality of 3.5 to 4.5;

or from the reaction of methylene diphenyl diisocyanate (MDI) with a poly(meth)acrylate polyol, where the poly(meth)acrylate polyol has an average OH functionality of 3.5 to 4.5, and where the molar ratio of isocyanate groups of polyisocyanate I1 to OH groups of the poly(meth)acrylate polyol P is between 3/1 and 10/1, and where the excess polyisocyanate I1 is removed by means of distillation after the reaction.

12. A method of adhesive bonding or of sealing, comprising the steps of i) applying a pretreatment composition according to claim 1 to a substrate S1 to be adhesively bonded or sealed;

ii) flashing off the pretreatment composition applied, such that the pretreatment composition forms a film on the substrate S1;

iii) applying an adhesive or sealant to the film that has been formed from the pretreatment composition and is present on the substrate S1; and iv) contacting the adhesive or sealant with a second substrate S2, the second substrate optionally likewise having been treated beforehand with the same or a different pretreatment composition.

13. The method as claimed in claim 12, wherein the substrate S1 comprises the residual bead of a previously partly removed, old cured adhesive, metal or painted metal, and the substrate S2 comprises glass, metal, painted metal or ceramic.

14. The method as claimed in claim 12, wherein the adhesive or sealant is a polyurethane adhesive containing at least one isocyanate-comprising polyurethane prepolymer or is an adhesive based on silane-functional polymers.

15. An article, an industrial good or a means of transport, the production of which involves performing a method as claimed in claim 12.

16. The pretreatment composition as claimed in claim 1, wherein the solvent L is selected from the group consisting of methyl acetate, ethyl acetate, butyl acetate, isopropyl acetate, 1-methoxy-2-propyl acetate, 3-methoxy-n-butyl acetate, acetone, butanone, methyl ethyl ketone, methyl isobutyl ketone, ethylal, toluene and ethylbenzene, and from mixtures of these solvents.

* * * * *